United States Patent

Hanson

[15] 3,697,735

[45] Oct. 10, 1972

[54] HIGH-SPEED PARALLEL BINARY ADDER

[72] Inventor: Lawrence G. Hanson, Temple City, Calif.

[73] Assignee: Burroughs Corporation, Detroit, Mich.

[22] Filed: July 22, 1969

[21] Appl. No.: 843,524

[52] U.S. Cl. .................................... 235/175, 235/173
[51] Int. Cl. .................................... G06f 7/385, G06f 7/38
[58] Field of Search .................................... 235/173, 175

[56] References Cited

UNITED STATES PATENTS

| | | | |
|---|---|---|---|
| 3,440,413 | 4/1969 | Betts | 235/175 X |
| 3,465,133 | 9/1969 | Booher | 235/175 |
| 3,440,412 | 4/1969 | Kardash | 235/175 |
| 2,879,001 | 3/1959 | Weinberger et al. | 235/175 |

OTHER PUBLICATIONS

Flores, The Logic of Computer Arithmetic, Prentice-Hall Inc., 1963, Pgs. 83–88.

*Primary Examiner*—Malcolm A. Morrison
*Assistant Examiner*—James F. Gottman
*Attorney*—Christie, Parker & Hale

[57] ABSTRACT

There is described a parallel adder for operands of 48 bits in which the carry information is generated simultaneously for all orders. The carry logic, consisting entirely of AND gates, is arranged in three levels. The adder consists of independent subadders of four orders each. The carry logic and subadders combine to form a maximum of four cascaded gate levels for generating the sum of any order of bits. Duplicate true and false logic is used at all levels. The second and third levels of the carry logic are arranged in an interleaved configuration to limit fanning.

6 Claims, 7 Drawing Figures

INVENTOR.
LAWRENCE G. HANSON
BY
Christie, Parker & Hale
ATTORNEYS

CARRY-III LEVEL

SUB-ADDER

HIGH-SPEED PARALLEL BINARY ADDER

FIELD OF THE INVENTION

This invention relates to binary adders, and more particularly, it is concerned with an extremely high-speed parallel adder realizing simultaneous carry for all orders of magnitude of the adder.

PRIOR ART

In parallel type adders, all orders of bits of the addend and augend are received at the input in parallel and all bits of the sum are provided at the output in parallel. In any parallel adder, some provision must be made for passing carry information on from a lower order sum to the next higher order. This is generally accomplished by what is known as propagate carry logic in which the carry information generated in the lowest order position "ripples" through to the highest order position of the adder. However, the propagation of the carry takes time and the resulting delay is accumulative so that a sufficient time must be allotted for the adder to function based on the maximum time it takes for a carry to ripple through all orders of the adder.

In order to achieve faster operation, parallel adders haven been proposed which utilize what is known as "a conditional sum" carry logic. In this arrangement, a sum both with a carry and without a carry is generated for each order and a selection is then made based on carry information from the lower orders. A third type of parallel adder utilized what is known as "look ahead" carry logic, in which carry information is generated simultaneously for all orders of magnitude of the adder. However, because of the complexity of carry logic circuitry required fro generating simultaneous carries, the look-ahead type carry has heretofore not been practical for adders involving substantial numbers of bit positions. Various hybrid arrangements utilizing combinations of the propagate carry and the simultaneous carry have been proposed to reduce the overall operating time inherent in the propagate carry and yet limit the circuit complexity inherent in the simultaneous type carry.

SUMMARY OF THE INVENTION

The present invention is directed to a parallel adder for adding operands having a large number of bits, for example, 48 binary bits. The adder achieves extremely high-speed operation by utilizIng the principles of a simultaneous carry in a novel circuit configuration which greatly limits the circuit complexity heretofore required. In addition to providing simultaneous carry so that the carry for the high-order positions are generated within the same time period as the carry for the low-order positions, the adder circuit of the present invention achieves high speed of operation by eliminating all restoring type elements, such as flip-flops, inverters, and buffers from the adder circuit. Only gates, which are nonrestoring type elements, are used. Typically such gating elements introduce a time delay of the order of only three nanoseconds as compared to inverters and buffers which introduce time delays of the order of 17 to 23 nanoseconds. The gating logic in the circuit of the present invention is further arranged so that a maximum of four gates are cascaded between the input and the output of the adder including the associated carry logic, so that maximum delay time for generating the total sum plus carry for all bits is 12 nanoseconds.

The improved adder with its high-speed operation is achieved by a circuit arrangement which is modular in design. There are twelve subadders of four bit positions per subadder. The simultaneous carry logic utilizes three cascaded levels of gates for providing carry signals simultaneously to each subadder. The first level of the carry logic is arranged in a plurality of sections, each section receiving two orders of bits of both the addend and augend. The second level has half as many sections, each section receiving the outputs from four sections of the first level. The sections of the second level are arranged in two groups, an odd group, and an even group with connections between sections of the first level and the respective sections of the two groups of the second level overlapping. The third level is in two sections connected, respectively, to the two groups of the second level, the third level providing a separate carry signal to each subadder, with the carry signals form the two sections being interlaced in relation to the order of the subadders.

The three levels of carry logic and the subadders combine to form no more than four gates in cascade between the input and output, with no restoring units to delay the communication time. Parallel true and false gating logic is duplicated throughout the circuit to avoid the use of inverters. The sum at the output of the subadders is set in an output register in less than a clock period following the setting of the augend and addend at the input.

BRIEF DESCRIPTION OF THE DRAWINGS

For a more complete understanding of the invention, reference should be made to the accompanying drawings, wherein.

DETAILED DESCRIPTION

Figure 1:
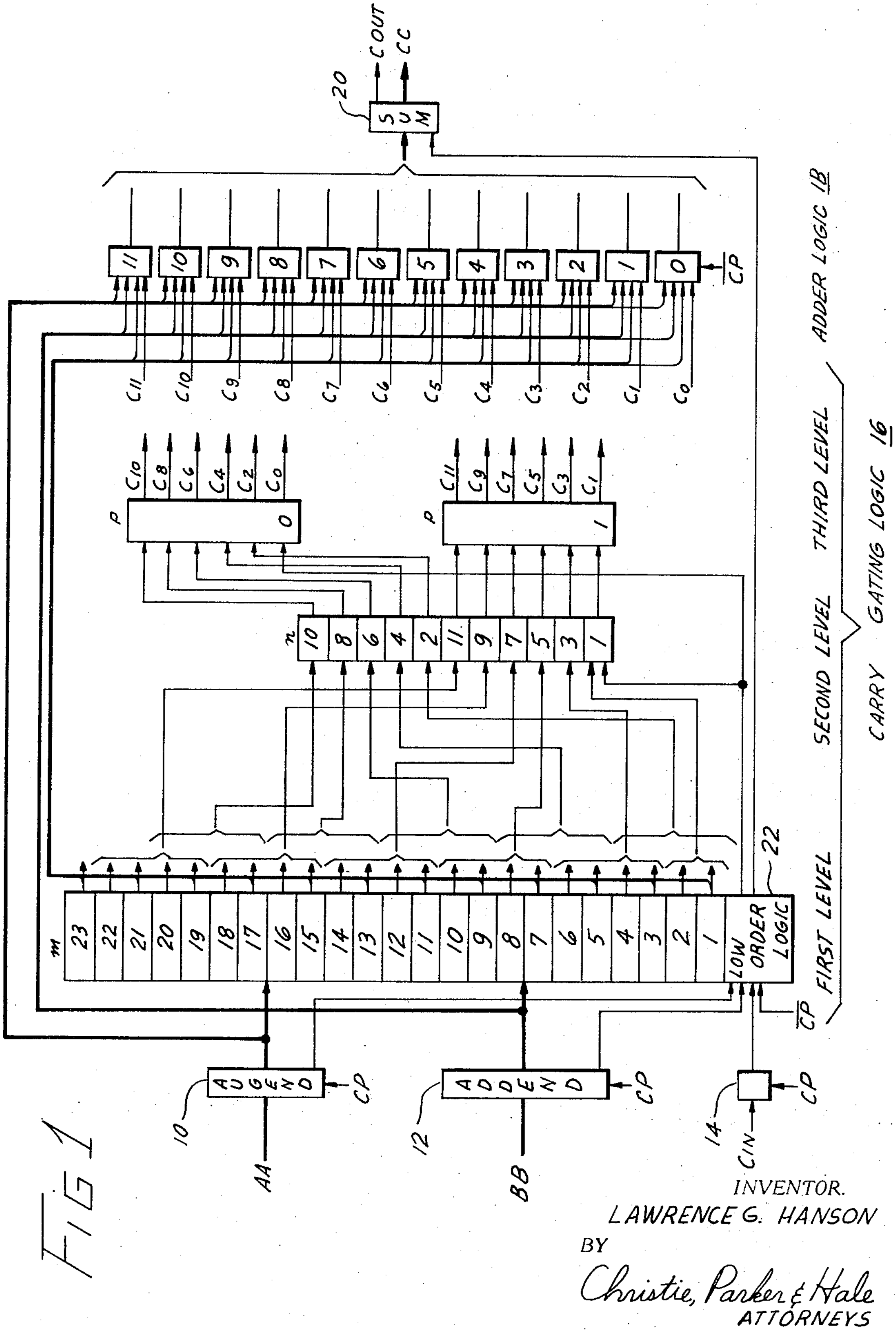
FIG. 1 is a block diagram of the complete adder including the three-level simultaneous carry logic circuit.

Referring to FIG. 1, the modular construction of the overall adder circuit of the present invention is shown. An input register 10 receives the augend, all of the bits being received in parallel on input lines designated AA in response to a clock pulse CP. In the preferred embodiment, it is assumed that there are 48 bits in the operands. Similarly, a second input register 12 stores the binary bits of the addend received over input lines BB. A single flip-flop 14 stores input carry information received on an input line $C_{in}$. The information output signal levels from the registers 10 and 12 and carry flip-flop 14 are applied both to a carry gating logic circuit 16 and to an adder logic circuit 18. The adder logic circuit 18 combines the output of the carry gating logic circuit 16 with the information from the input registers 10 and 12 to produce the desired binary sum which is stored in an output register 20. The sum from the output register 20 provides forty-eight bits on output lines CC plus a carry output indicated at $C_{out}$.

The adder logic circuit 18 consists of 12 subadder sections, numbers 0 through 11, which are independent of each other. The subadders are identical and each receive four bits of the augend from the input register 10 and four bits of the addend from the input register 12. In addition, each subadder receives its own carry signal from the output of the carry gating logic circuit 16.

The carry gating logic circuit 16 includes three cascaded levels of gating logic, referred to as the first, second, and third levels, respectively. The first level of the carry circuit includes 23 identical sections, numbered 1 through 23. Each of these sections receives two orders of bits from both the augend and the addend. In addition, the first level of the carry circuit 16 includes a special low-order logic circuit 22 which looks at the lowest order bit of the augend and the addend, together with the carry input, and sets the lowest order bit in the sum stored in the output register 20. The low-order logic circuit 22 also provides output signal levels to the second level and third level of the carry circuit 16.

Figure 2:
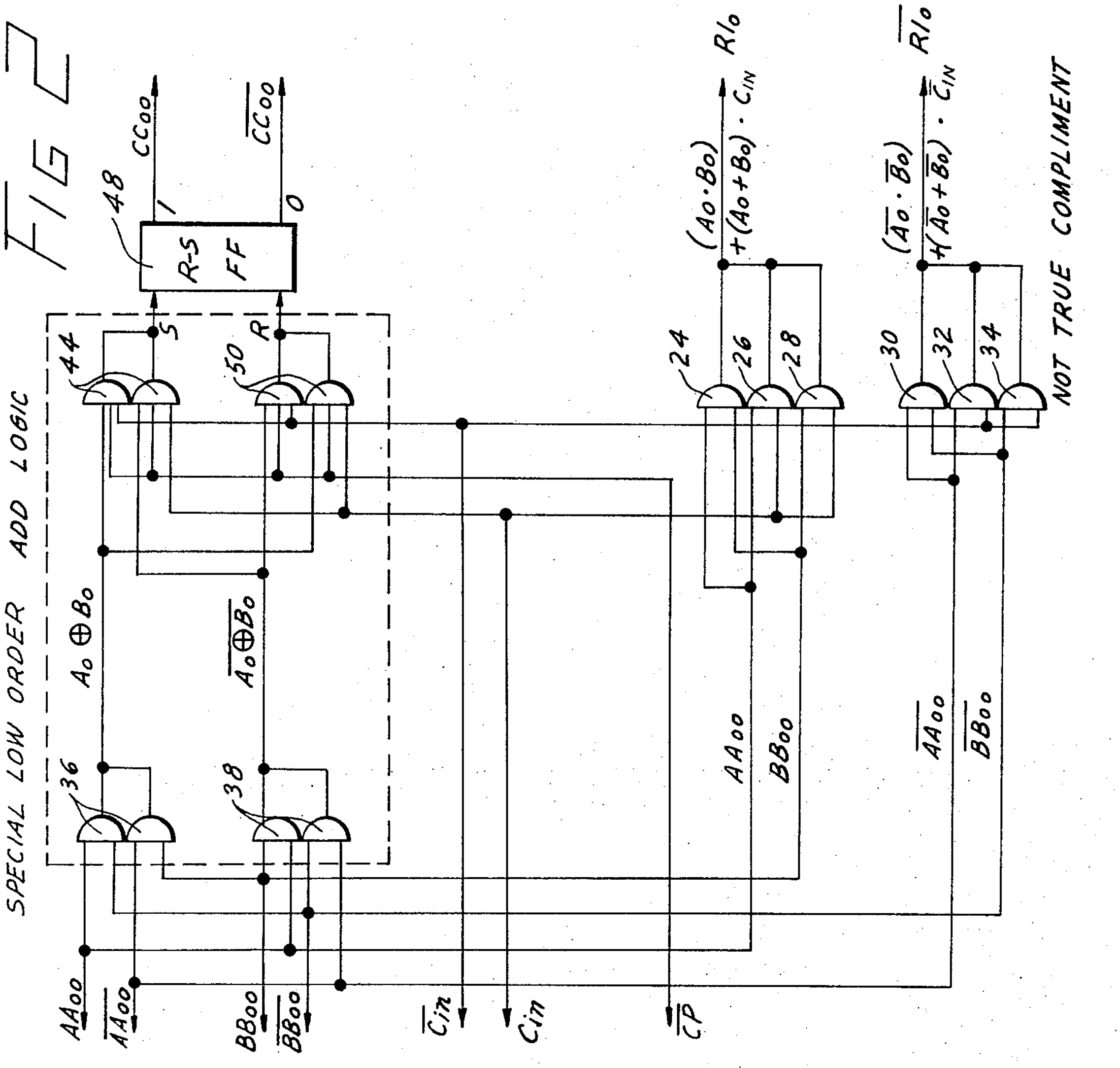
FIG. 2 is a schematic block diagram of the special low-order adder logic.

The schematic block diagram for the special low-order logic circuit 22 is shown in FIG. 2. The carry portion of the special low-order logic circuit includes two groups of three AND gates, the gates being indicated at 24, 26, 28, 30, 32, and 34, respectively. The first group of three gates is the true logic, and the second group of three gates is the duplicate false logic. The true logic gates 24, 26, and 28 receive the low-order bit levels $AA_{oo}$and $BB_{oo}$and the input carry bit $C_{in}$, producing an output level $R1_{oo}$ in a common output according to the equation $$R1_{oo}=AA_{oo}\cdot BB_{oo}+(AA_{oo}+BB_{oo})\cdot C_{in}$$

Similarly, the false logic gates 30, 32, and 34 produce an output according to the relation $$\overline{R1}_{oo}=\overline{AA}_{oo}\cdot\overline{BB}_{oo}+(\overline{AA}_{oo}+\overline{BB}_{oo})\cdot\overline{C}_{in}$$

It should be noted throughout the drawings that the logic equations are reproduced using the single letters A and B to represent the input bit AA and BB for simplicity.

The special low-order logic circuit 22 also includes an adder portion for generating the lowest order bit of the sum and storing it in the lowest order flip-flop of the output register 20. The adder portion includes two pairs of AND gates, 36 and 38, respectively, to which the levels from the low-order bit in both the input registers 10 and 12 are applied. The AND gates 36 are connected to a common output so as to provide the exclusive OR function $A_o\oplus B_o$. The gates 38 similarly are connected to a common output to provide the exclusive OR function of the false logic $\overline{A}_o\oplus\overline{B}_o$. A pair of AND gates 44 having their outputs connected comprise an exclusive OR circuit which sets the lowest order flip-flop in the output register 20, indicated at 48, to the true state. A second pair of AND gates 50 have their outputs connected in common to reset the flip-flop 48 to the false state. Thus, the four pairs of gates combine to form the sum of the two binary input bits. The inverse of the clock pulse, designated $\overline{CP}$ is also applied to pairs of gates 44 and 50 to insure that the flip-flop 48 is set or reset at a time between clock pulses when the input registers 10 and 12 may be changing.

Figure 3:
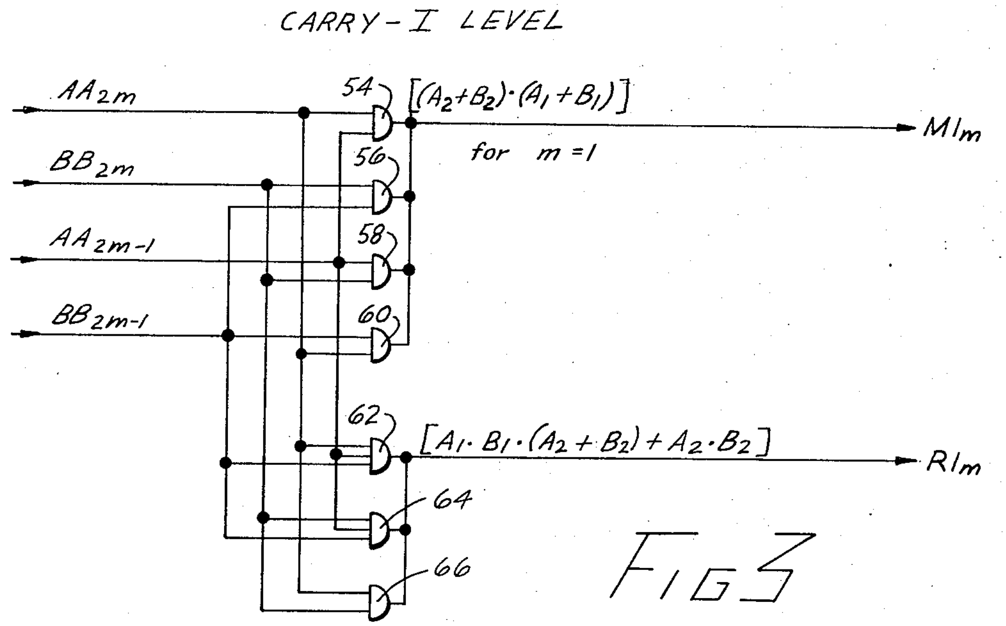
FIG. 3 is a block diagram of one section of the first level of the carry logic circuit.

The first level of the carry gating logic 16, in addition to the low-order logic circuit 22, includes 23 identical sections, each of which receives two bits of the augend and the addend starting with the next to lowest order bits. The circuit for any section *m*, where *m* is any number 1 through 23, is shown in FIG. 3. While each section includes both positive and negative logic, only the positive logic is shown since the true and false logic circuits are duplicates with the inputs to the false logic being the complements to the inputs to the true logic. The circuit of FIG. 1 includes a group of four AND gates 54, 56, 58, and 60 connected to a common output designated $M1_m$. The inputs to the four gates are connected to the bits $AA_{2m-1}$ and $AA_{2m}$ of the augend of the input register 10 and to the bits $BB_{2m-1}$ and $BB_{2m}$ of the addend of the input register 12. The same group of input bits are applied to a second group of three AND gates 62, 64, and 66 connected to a common output designated $R1_m$. The gating logic of FIG. 3 satisfies the equations $$M1_m=(AA_{2m}+BB_{2m})\cdot(AA_{2m-1}+BB_{2m-1})$$

$$R1_m=AA_{2m}\cdot BB_{2m}+AA_{2m-1}\cdot BB_{2m-1}\cdot(AA_{2m}+BB_{2m})$$

Similarly each section produces the false logic terms according to the equations $$\overline{M1}_m=(\overline{AA}_{2m}+\overline{BB}_{2m})\cdot(\overline{AA}_{2m-1}+\overline{BB}_{2m-1})$$

$$\overline{R1}_m=\overline{AA}_{2m}\cdot\overline{BB}_{2m}+\overline{AA}_{2m-1}\cdot\overline{BB}_{2m-1}\cdot(\overline{AA}_{2m}+\overline{BB}_{2m})$$

It should be noted that $R1_m$ and $\overline{R1}_m$, and also $M1_m$ and $\overline{M1}_m$, are not true complements at this level. Each section of the first level of the carry logic establishes there is a carry into the 2m+1 bit position and there is a carry into the 2m−1 bit position, where *m* is the number of the particular first level section, that is, any number 1 through 23.

Figure 4:
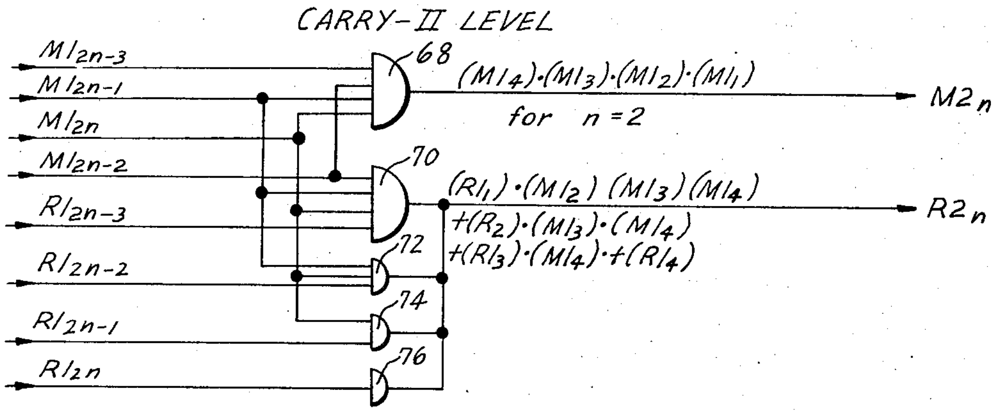
FIG. 4 is a schematic block diagram of one section of the second level of the carry logic circuit.

The second level of the carry logic 16 consists of 11 sections, numbered 1 through 11 in FIG. 1. These sections are arranged in two groups, an odd-numbered group having six sections and an even-numbered group having five sections. The circuit of each of these sections is identical and consists of a true logic portion and a duplicate false logic portion. The true logic portion is shown in FIG. 4. It will be seen that the true logic of each section of the second level receives eight inputs, namely, the R1 and M1 levels from each of four consecutive sections of the first level of the carry logic circuit. Moreover, there is an overlapping between the inputs to the odd-numbered sections of the second level and the inputs to the even-numbered sections of the second level. Thus, section 2 of the second level receives inputs from sections 1 through 4 of the first level while section 3 of the second level receives inputs from sections 3 through 6.

In the more generalized notation of FIG. 4, any section n of the second-level sections 1 through 11 receives the R1 and M1 outputs from the first level sections having numbers corresponding to 2n, 2n−1, 2n−

2, and 2n−3. The four M1 outputs of the first level going to a single second-level section are connected to a single AND gate 68 to produce an output level $M2_n$. The four R1 input levels are applied, respectively, to four AND gates 70, 72, 74, and 76. The four AND circuits are connected to a common output designated $R2_2$. The logic of each section of the second carry level provides the relationship $$M2_n = M1_{2n} \cdot M1_{2n-1} \cdot M1_{2n-2} \cdot M1_{2n-3}$$

$$R2_n = R1_{2n-3} \cdot M1_{2n-2} \cdot M1_{2n-1} \cdot M1_{2n} + R1_{2n-2} \cdot M1_{2n-1} \cdot M1_{2n} + R1_{2n-1} \cdot M1_{2n} + R1_{2n}$$

where $n$ is the number of the section in the second level and may be any number 1 through 11. It should be noted that in the lowest order section of the second level, namely, section 1, the input term $R1_{2n-2}$ becomes $R1_o$. This term is derived from the output of the low-order logic circuit 22. There is no input for the term $R1_{2n-3}$ in section 1 of the second level, so this term is always set at the 0 level. There is also no input to the terms $M1_{2n-2}$ and $M1_{2n-3}$ in the lowest order section 1 of the second level. These two terms are always set to the 1 level. The false logic portion is identical except that the $\overline{R1}_n$ and $\overline{M1}_n$ terms are provided on the input to generate the two output terms $\overline{R2}_n$ and $\overline{M2}_n$.

The third level of gating logic of the carry logic circuit 16 is in two sections, section 1, or odd section, and section 0, or even section. The logic circuitry for the two sections is identical and is shown in detail in FIG. 5. Section 1 receives the outputs of odd-numbered sections 1 through 11 of the second level, while section 0 receives the outputs of the even-numbered sections 2 through 10 of the second level, plus the $R1_o$ and $\overline{R1}_o$ from the low-order logic section 22. Section 1 of the third level produces the carries for each of the odd-numbered subadders 1 through 11 and their complements, while section 0 produces the carries for all the even-numbered subadders 0 through 10 and their complements.

Figure 5:
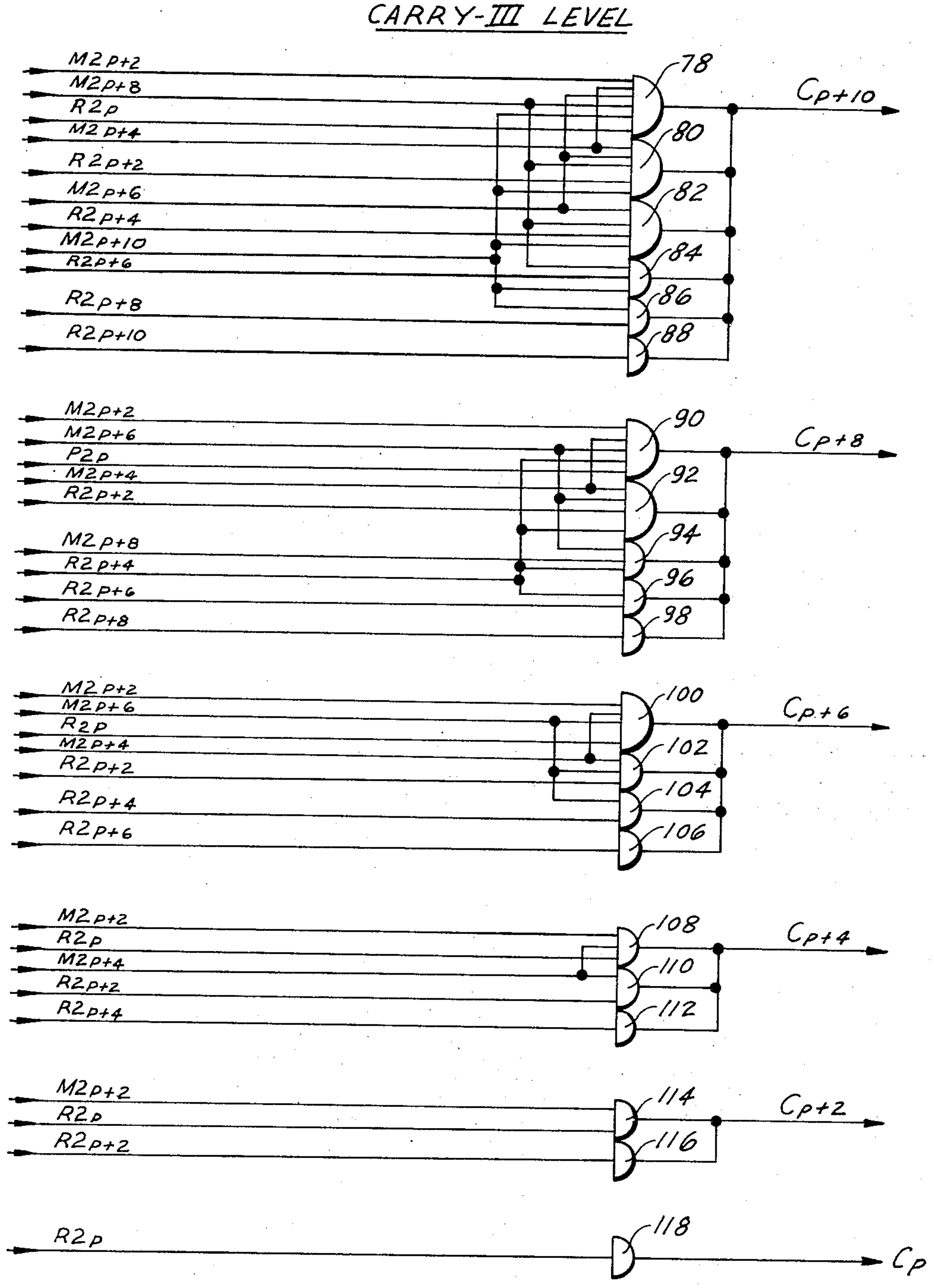
FIG. 5 is a schematic block diagram of the third level of the carry logic.

Referring to FIG. 5, it will be seen that the logic consists of six groups of AND gates, the top group having six AND gates, 78, 80, 82, 84, 86, and 88, with a common output. The next group has five AND gates, 90, 92, 94, 96, and 98, with a common output. The third group has four AND gates, 100, 102, 104, and 106, with a common output. The fourth group has three AND gates, 108, 110, and 112. The fifth group has two AND gates, 114 and 116, while the sixth group has a single AND gate, 118. The gate 118 receives an input $R2_p$ and produces an output level $C_p$, where p is the number of the section in the third level of the carry logic circuit 16 and may be either 0 or 1. It should be noted that $R2_o$ is derived from the $R1_o$ output of the low-order circuit 22. Wherever the same term appears in each of the other groups of gates, it similarly is derived from the output $R1_o$ of the special logic circuit 22. The logic of the highest order portion of the third level logic satisfied the equation $$C_{p+10} = R2_p \cdot M2_{p+2} \cdot M2_{p+4} \cdot M2_{p+6} \cdot M2_{p+8} \cdot M2_{p+10}$$
$$+ R2_{p+2} \cdot M2_{p+4} \cdot M2_{p+6} \cdot M2_{p+8} \cdot M2_{p+10}$$
$$+ R2_{p+4} \cdot M2_{p+6} \cdot M2_{p+8} \cdot M2_{p+10}$$
$$+ R2_{p+6} \cdot M2_{p+8} \cdot M2_{p+10}$$
$$+ R2_{p+8} \cdot M2_{p+10}$$
$$+ R2_{p+10}$$

The lower order portions of the third level follow the same pattern of the above equation but with the last term of each line of the equation dropping out for the next lower order. For example, $C_{p+8}$ is the same as the above equation with the $R2_{p+10}$ and $M2_{p+10}$ terms dropped out.

Each section of the third level includes a duplicate logic for generating the complements of each of the carries. Since the false logic is the same as the true logic, it has not been shown.

Figure 6:
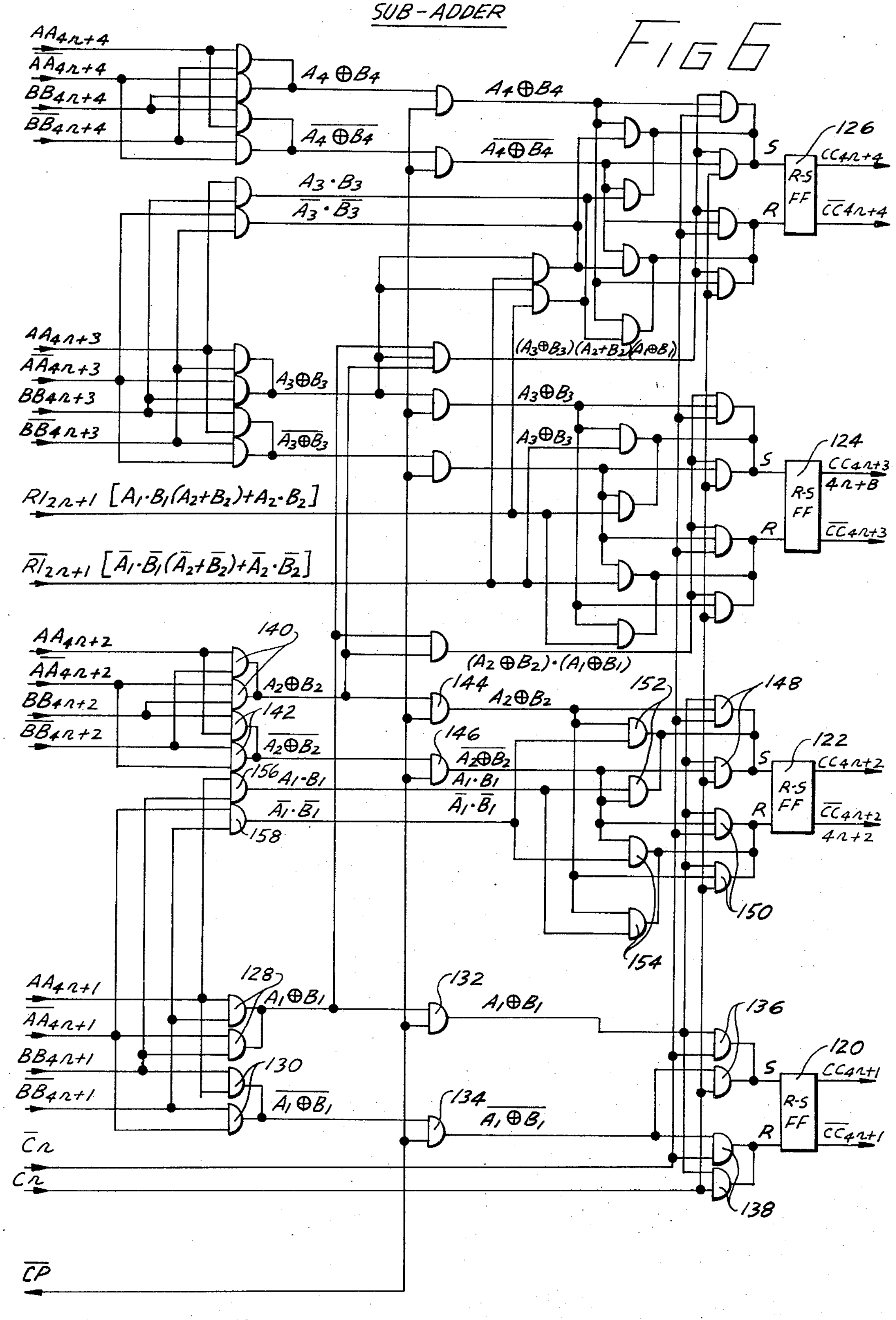
FIG. 6 is a block schematic diagram of the subadder circuit.

There are twelve subadders, numbered 0 through 11, which are all identical. Each subadder sets one flip-flop in the output register 20 to either the 0 state or the 1 state in response to the binary sum of the corresponding order of bit at the input and the carry from the carry logic circuit 16. Referring to FIG. 6, the four flip-flops of the output register associated with the subadder are indicated at 120, 122, 124, and 126. The lowest order output bit $CC_{4r+1}$, where $r$ corresponds to the number of the subadder and is any number 0 through 11, is derived from the two input bits $AA_{4R+1}$ and $BB_{4r+1}$. These two bits, together with their complements from the input registers 10 and 12 storing the augend and the addend, are applied to two exclusive OR circuits 128 and 130, each comprising a pair of AND gates connected to a common output. The outputs of the two exclusive OR circuits 128 and 130 are connected, respectively, to AND gates 132 and 134, together with the inverted clock pulse $\overline{CP}$. This insures that the summing function takes place between normal clock pulses and not while the input registers may be changing. A second pair of exclusive OR circuits 136 and 138 also are connected to perform the exclusive OR function in response to the input carry signal $C_n$ and its complement $C_n$ and the output of the exclusive OR circuits 128 and 130. The output of the exclusive OR circuit 136 sets the flip-flop 120 to the 1 state, corresponding to output bit $CC_{4r+1}$, while the output of the exclusive OR circuit 138 sets the flip-flop 120 to the 0 state, corresponding to the complement $\overline{CC}_{4r+1}$. The two sets of exclusive OR circuits for the true and false logic perform the function of a full adder for the eight possible combinations of the three input bits AA, BB, and C according to the following truth table:

| | | | | | | | | |
|---|---|---|---|---|---|---|---|---|
| AA | 0 | 1 | 0 | 0 | 1 | 1 | 0 | 1 |
| BB | 0 | 0 | 1 | 0 | 1 | 0 | 1 | 1 |
| C | 0 | 0 | 0 | 1 | 0 | 1 | 1 | 1 |
| Sum-CC | 0 | 1 | 1 | 1 | 0 | 0 | 0 | 1 |
| Carry | 0 | 0 | 0 | 0 | 1 | 1 | 1 | 1 |

The second lowest order sum bit $CC_{4r+2}$ is derived from the next higher order bits from the two input registers, namely, $AA_{4r+2}$ and $BB_{4r+2}$. These bits, together with their complements, are applied to two pairs of AND gates constituting two exclusive OR circuits 140 and 142, respectively, for the true and false logic. The two outputs are coupled through AND gates 144 and 146 to which the $\overline{CP}$ signal is applied to two pairs of AND gates comprising exclusive OR circuits 148 and 150 in the same manner as described above in connection with the lowest order bit. The output of the exclusive OR circuits 148 and 150 are connected, respectively, to the set and reset inputs of the flip-flop 122 to set the flip-flop to either the 1 state or the 0 state. The AND gates of the exclusive OR circuits 148 and 150 respond to the external carry signals $C_n$ and its complement $\overline{C}_n$. In addition, all of the AND gates of the exclusive OR circuits 148 and 150 are connected to the output of the exclusive OR circuit 128 in the lower order bit position. This insures that the second order bit can be set by the OR gates 148 and 150 only if one or the other of the lower order bits is true, which condition indicates a carry is formed by the lower order sum, as shown by columns six and seven of the above truth table.

Each of the exclusive OR circuits 148 and 150 are shunted, respectively, by a pair of exclusive OR circuits 152 and 154, each consisting of a pair of AND gates. The exclusive OR circuit 152, in addition to receiving the output of the exclusive OR circuit 140, receives an internal carry signal from an AND gate 156 whose output is true if both the bits of the lowest order of the subadder are true. Similarly, a gate 158 provides the false logic term.

It will be seen that the second portion of the subadder, in generating the sum of the two input bits, utilizes both an internal carry and an external carry. The external carry, of course, is derived from the carry logic circuit 16 and the internal carry is derived from the lower order bit positions within the subadder. This permits a simultaneous addition of carries in all four orders of magnitude within the subadder. The internal carry information is introduced through the exclusive OR circuit 152 for the true logic, and the exclusive OR circuit 154 for the false logic, while the external carry is introduced through the exclusive OR circuit 148 for the true logic, and the exclusive OR circuit 150 for the false logic.

Figure 7:
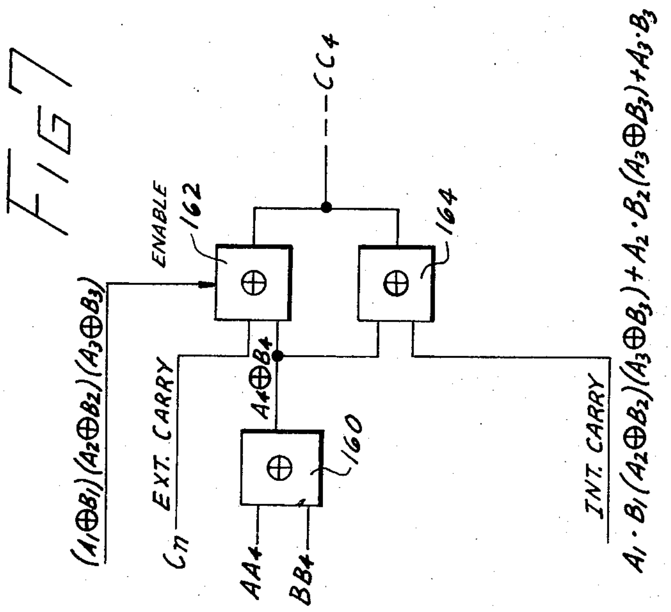
FIG. 7 is a simplified block diagram of one bit section of a subadder.

The operation of the subadder can best be understood by reference to the simplified block diagram of FIG. 7 for the fourth or highest order bit position. Only the true logic portion is shown. The two inputs $AA_4$ and $BB_4$ are applied to an exclusive OR circuit 160. The output of the exclusive OR is true only if $AA_4$ or $BB_4$ is true, but not if both are true. The output level of the exclusive OR circuit is coupled to one input of an exclusive OR circuit 162 to which is also applied the external carry C. If this were the carry propagate from the lower order bit, as in the conventional propagation type of parallel adder, the output of the exclusive OR circuit 162 would be the correct binary sum. In other words, the exclusive OR circuits 160 and 162 function as a full adder according to the truth table above. The circuit as thus far described is precisely the circuit of the lowest order bit of the subadder already described. However, the external carry C by itself only provides a true carry to the lowest order adder section and not to the higher order adder sections within the subadder. The external carry C is only significant in the higher orders of the subadder if the two input bits to each of the lower orders are not the same. This is apparent from columns six and seven of the above truth table. Therefore, a third input is provided to the exclusive OR circuit 162, which is true only if the bits to each of the lower orders within the subadder are unequal. In other words, the external carry logic determines when the presence of a carry at the lowest order section would cause a carry to, in effect, propagate through to the higher order sections. The external carry may be expressed as follows:

$$\text{External Carry}=C(A_1\oplus B_1)(A_2\oplus B_2)(A_3\oplus B_3)$$

There must also be some means for accounting for carries generated within the lower orders within the same subadder in the absence of the external carry. This is accomplished by a second exclusive OR circuit 164, one input of which is coupled to the output of the exclusive OR circuit 160 and the other input of which is an internal carry signal derived from the lower orders within the subadder. The internal carry within the subadder is generated according to the following relationship:

Internal carry=

$$A_1\cdot B_1(A_2\oplus B_2)(A_3\oplus B_3)+A_2\cdot B_2\,(A_3\oplus B_3)+A_3\cdot B_3$$

Thus, it will be seen that the internal carry is true if both bits to the next lowest order are true, or if both bits to the second lowest order are true and one or the other of the bits to the next lower order are true, or if both bits to the lowest order are true and one or the other of the bits to the other two orders are true.

Referring again to FIG. 6, it will be noted that the internal carry for the two highest orders of the subadder utilize the $R_1$ and $\overline{R}_1$ terms derived from the first level of the carry logic circuit 16. This is merely done to simplify the internal carry logic circuitry of the subadder.

From the above description, it will be seen that a parallel adder is provided in which carries to all orders of magnitude are generated simultaneously. By using duplicate true and false logic throughout, no inverters or other restoring elements are required. Thus, the logic circuitry is constructed entirely of non restoring type AND gates with the maximum number of gates cascaded in series being limited to four. Since the AND gates may be constructed to operate within delay times of 3 nanoseconds, the total time required to generate the complete sum of the 48 bit operands is 12 nanoseconds. By arranging the carry logic in three levels with overlapping and interleaving of connections between levels as described, the amount of fanning or pyramiding of the logic is greatly reduced over conventional simultaneous carry type parallel adders.

What is claimed is:

1. A high-speed parallel binary adder comprising first and second input registers for storing a large number of binary bits representing an augend and an addend, an output register for storing a resultant, a gating logic circuit consisting entirely and exclusively of gating elements interconnecting the two input registers and the output register for producing the binary sum in the output register of the binary numbers in the two input registers, the gating circuit including an adder logic section and a carry logic section, both sections being connected to the outputs of the two input registers, the output of the carry section being connected to the adder section, the adder section including a plurality of identical sub-adder units, each of the sub-adder units receiving a portion of the bits from the two input registers and receiving a carry bit from the carry section, the carry section including three levels of gating elements, the first level having a plurality of identical sections, each section receiving two bits from each of the input registers and providing two binary output signals, the second level having a plurality of identical sections, all but the highest order and lowest order sections receiving the output signals from four sections of the first level with each section having two inputs common with two inputs to one other section and having the remaining two inputs common with two inputs to another section and providing two binary output signals, and the third level having two identical sections, one section receiving all the output signals from a first group of sections of the second level and the other section receiving all the output signals of the remaining group of sections of the second level, the sections in each of said groups of the second level having no inputs in common with other sections of the same group, each section of the third level providing a plurality of output carry bits, each sub-adder receiving one of said carry bits.

2. Apparatus as defined in claim 1 wherein each sub-adder receives four binary bits from each of the input registers and generates four output bits representing the binary sum of said four input bits and the carry bit from the third level of gating elements in said carry section.

3. Apparatus as defined in claim 2 wherein each identical section of all three gating levels includes duplicate gating for both true and false logic to provide both a carry bit and its complement to each subadder.

4. Apparatus as defined in claim 1 wherein each section of the first gating level includes gating logic for providing said two output signals in accordance with the equations $$R1_m=AA_{2m}\cdot BB_{2m}+AA_{2m-1}\cdot BB_{2m-1}\cdot(AA_{2m}+BB_{2m})$$

$$M1_m=(AA_{2m}+BB_{2m})\cdot(AA_{2m-1}bzBB_{2m-1})$$

where R1 and M1 are the two output signals, AA and BB are bits from the two input registers with the order of the bits represented by the subscripts, $m$ is the order of the section and is any integer starting with 1, the dot (·) represents the logical AND, and the plus (+) represents the logical inclusive OR; each section of the second gating level includes gating logic for providing said two output signals in accordance with the equations $$R2_n=R1_{2n-3}\cdot M1_{2n-2}\cdot M1_{2n-1}\cdot M1_{2n}$$
$$+R1_{2n-2}\cdot M1_{2n-1}\cdot M1_{2n}$$
$$+R1_{2n-1}\cdot M1_{2n}$$
$$+R1_{2n}$$
$$M2_n=M1_{2n-3}\cdot M1_{2n-2}\cdot M1_{2n-1}\cdot M1_{2n}$$

where M2 and R2 are the two output signals and $n$ is the order of the section and is any integer starting with 1; and each section of the third gating level includes gating logic for providing said plurality of carry bits in accordance with the following series of equations:

$$C_p=R2_p$$
$$C_{p+2}=R2_p\cdot M2_{p+2}+R2_{p+2}$$
$$C_{p+4}=R2_p\cdot M2_{p+2}\cdot M2_{p+4}+R2_{p+2}\cdot M2_{p+4}+R2_{p+4}$$
.
.
.
$$C_{p+q}R2_p\cdot M2_{p+2}\cdot M2_{p+4}\ldots M2_{p+q}+R2_{p+2}\cdot M2_{p+4}\ldots M2_{p+q}+\ldots+R2_{p+q}$$

where C is an output carry bit, $p$ is either 0 or 1 and $q$ is any even integer, and the subscript of C represents the order of the subadder to which the carry bit is connected.

5. A high-speed parallel binary adder for adding two binary coded operands and generating the binary sum comprising a carry generating circuit receiving simultaneously all orders of bits of both the operands and generating simultaneously a plurality of output signals, and a plurality of identical sub-adder circuits, each sub-adder circuit receiving a proportionate share of the bits of the two operands and one of said output signals from the carry generating circuit, each subadder generating the same proportionate share of the bits of the binary sum of said operands, each of said sub-adder circuits including, for each bit of the two operands received, a first exclusive OR circuit having two inputs to which the two operand bits are applied and an output, and a second exclusive OR circuit having two inputs, one input of said second exclusive OR circuit being connected to the output of the first exclusive OR circuit, the other input of the second exclusive OR circuit being connected to said one of the output signals from the carry generating circuit, and, for all but the lowest order bit of the two operands received by the sub-adder, a third exclusive OR circuit, the output of the second and third exclusive OR circuits being connected to a common output providing one bit of the sum, the third exclusive OR circuit having one input connected to the output of the first exclusive OR circuit, an internal carry logic circuit connected to all the lower order input bits applied to the sub-adder, the logic circuit having an output connected to the other input of the third exclusive OR circuit, and means for controlling the output of the first exclusive OR circuit such that the output is true only if all the outputs of the corresponding first exclusive OR circuits associated with the lower order bits applied to the same sub-adder are true.

6. Apparatus as defined in claim 5 wherein said internal carry logic circuit provides a binary output that is defined by the relation:

$$A_n\cdot B_n+A_{n-1}\cdot B_{n-1}(A_n+B_n)+A_{n-2}\cdot B_{n-2}(A_{n-1}+B_{n-1})(A_n+B_n)+\ldots$$ where $A_n$ and $B_n$ are the next lower order input bits to the sub-adder.

* * * * *

PO-1050
(5/69)

UNITED STATES PATENT OFFICE
CERTIFICATE OF CORRECTION

Patent No. 3,697,735 Dated October 10, 1972

Inventor(s) Lawrence G. Hanson

It is certified that error appears in the above-identified patent and that said Letters Patent are hereby corrected as shown below:

Column 1, line 26, change "haven" to --have--;
Column 1, line 31, "utilized" should read --utilizes--;
Column 1, line 35, "fro" should read --for--.
Column 2, line 22, "form" should read --from--.
Column 3, line 41, "$C_{in}$" should read --$C_{in}$.--.
Column 5, line 12, "$+Rl_{2n-2}$" should read --$+Rl_{2n-2}$.--.
Column 6, line 22, "$AA_{4R+1}$" should read --$AA_{4r+1}$--;
Column 6, line 37, before "and the", "$C_n$" should read --$\overline{C}_n$--.
Column 9, line 32, "$bzBB_{2m-1}$" should read --$+BB_{2m-1}$--.
Column 10, line 6, "$C_{p+q}$" should read --$C_{p+q}$=--.

Signed and sealed this 2nd day of April 1974.

(SEAL)
Attest:

EDWARD M.FLETCHER,JR.
Attesting Officer

C. MARSHALL DANN
Commissioner of Patents